US007723446B2

(12) United States Patent
Smith

(10) Patent No.: US 7,723,446 B2
(45) Date of Patent: May 25, 2010

(54) POLYPROPYLENE SERIES REACTOR

(75) Inventor: Lawrence C. Smith, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 96 days.

(21) Appl. No.: 11/879,914

(22) Filed: Jul. 19, 2007

(65) Prior Publication Data
US 2009/0023872 A1 Jan. 22, 2009

(51) Int. Cl.
C08F 2/00 (2006.01)
C08F 4/44 (2006.01)
B01J 19/00 (2006.01)
B01J 19/18 (2006.01)
F01N 3/20 (2006.01)

(52) U.S. Cl. .................. 526/64; 526/160; 526/170; 422/131; 422/132; 422/105

(58) Field of Classification Search .................. 526/64, 526/160, 170; 422/131, 132, 105
See application file for complete search history.

(56) References Cited

U.S. PATENT DOCUMENTS
6,235,852 B1  5/2001  Hess et al.
2003/0191251 A1  10/2003  McGrath
2005/0272891 A1*  12/2005  Fouarge et al. .............. 526/943
2007/0022768 A1  2/2007  Smith FOREIGN PATENT DOCUMENTS
EP        0479186       9/1991
EP        0891990       9/2004
WO        0479186       9/2004
WO   WO 2007/040996    4/2007

* cited by examiner

Primary Examiner—William K Cheung

(57) ABSTRACT

Aspects of the invention are directed to a process for producing polypropylene comprising: providing series reactors comprising a first and a second loop allowing flow of polypropylene, catalyst, hydrogen and propylene there between, wherein each loop comprises from six to eight legs, each leg having fluid connections there between; injecting into the first loop an amount of a catalyst, propylene and optionally hydrogen; withdrawing polypropylene, and unreacted propylene and optionally unreacted hydrogen from the first loop and injecting the polypropylene, and unreacted propylene and optionally unreacted hydrogen into the second loop; and providing a propylene/polypropylene separator fluidly connected to the second loop and isolating polypropylene therefrom. In one embodiment a recycle conduit is provided between the propylene/polypropylene separator and the second loop allowing the recycling of unreacted propylene and optionally hydrogen into the second loop.

8 Claims, 2 Drawing Sheets

POLYPROPYLENE SERIES REACTOR

FIELD OF THE INVENTION

The present invention relates in general to polypropylene reactors and a method of producing polypropylene, and more particularly, the present invention relates to series loop reactors for producing propylene homopolymer, copolymers, impact copolymers and other propylene-based polymers.

BACKGROUND

One of the most common processes for making polypropylene homopolymer and copolymer is based on what are commonly called loop reactors. In this process, a loop reactor is made up of a series of long, straight pipes (generally referred to as "legs") which are connected by bent pipes to form a continuous loop. Pumps are incorporated into this loop to circulate the polymer and liquid monomer slurry. Propylene polymerization is an exothermic reaction so heat must be removed from the reactors. One method of efficient heat removal is to provide jacketed reactor legs, such as described in U.S. Publication No. 2007/0022768 A1 to Smith, where water flows through the jackets to control the reactor temperature by removing heat from the reactor slurry.

One type of reactor design for high capacity polymerization lines uses two of these loop reactors operating in series. That is, catalyst and liquid monomers are fed to the first reactor and the slurry that leaves that reactor along with more liquid monomers is fed to the second reactor. Slurry leaving the second reactor is sent on for monomer separation and recovery. In this design the maximum capacity of the line may be determined by the heat transfer area available in these reactors. For new plants it is desired to increase plant capacity to reduce the capital and operating cost per unit of production. Various small increases have been achieved by increasing the reactor operating temperature, decreasing the temperature of the circulating cooling water and increasing the circulation rates of the water used to remove heat from the reactors. However, no major increase in capacity above a nominal 400 to 450 kTons per year rate is possible in the current reactor design.

Also, the basic plant design with two series reactors has limitations in the capability to produce polymers of different molecular weights in the two reactors. This is a feature that is desired for some products. The slurry leaving the first loop reactor is a large portion of the feed to the second loop reactor. Therefore any hydrogen that is fed to the first loop reactor and not consumed in that reactor is automatically fed to the second reactor. Even if no additional hydrogen is added to the second reactor the concentration in that reactor will not be significantly different than in the first reactor. It is possible to only add hydrogen to the second of the two series loop reactors so that its hydrogen concentration is much higher than in the first reactor. However, the slurry leaving the second reactor is normally about 50% polypropylene polymer and 50% unreacted propylene/propane/hydrogen. After the polymer is separated, the unreacted propylene/propane/hydrogen is condensed, mixed with fresh propylene feed and that mixture is routed to both loop reactors. Because the unreacted propylene/propane/hydrogen from the second loop reactor contains unreacted hydrogen there will be some hydrogen in the mixture of fresh and recycle propylene streams and there will be some hydrogen entering the first loop reactor even if there is no additional hydrogen fed to that reactor. This limits the extent to which different molecular weight polymers can be made in the two reactors.

The inventor has solved these and other problems in aspects of the invention as described herein.

SUMMARY

One aspect of the invention is directed to a series polypropylene reactor comprising a first and a second loop allowing flow of polypropylene, catalyst, hydrogen and propylene there between, wherein each loop comprises from six to eight legs, each leg having fluid connections there between.

Another aspect of the present invention is directed to a process for producing polypropylene comprising:
 (a) providing series reactors comprising a first and a second loop allowing flow of polypropylene, catalyst, hydrogen and propylene there between, wherein each loop comprises from six to eight legs, each leg having fluid connections there between;
 (b) injecting into the first loop an amount of a catalyst, propylene and optionally hydrogen;
 (c) withdrawing polypropylene, and unreacted propylene and optionally unreacted hydrogen from the first loop and injecting the polypropylene, and unreacted propylene and optionally unreacted hydrogen into the second loop; and
 (d) providing a propylene/polypropylene separator fluidly connected to the second loop and isolating polypropylene therefrom.

These aspects of the invention can be combined with the various embodiments disclosed herein.

DETAILED DESCRIPTION

As used herein, "polypropylene" includes both homopolymers of propylene and copolymers of propylene and another monomer-derived unit where the propylene-derived units comprise at least 50 wt % of the polymer.

One aspect of the present invention is directed to a series polypropylene reactor comprising a first and a second loop reactor (or first or second "loop") allowing flow of polypropylene, catalyst, hydrogen and propylene (and optionally a diluent) there between, wherein each loop comprises from six to eight legs, each leg having fluid connections there between. The "flow" of materials can be assisted by pumps, pressure differentials and other means as is commonly known in the art, the flow of materials in certain embodiments achieved though fluid connections. The term "fluid connections" includes piping, conduits and other means of allowing liquids and/or suspensions (e.g., a slurry of liquid propylene and solid polymer material) as is commonly known in the art to flow from one place to another without exposure to the atmosphere. In one embodiment, comonomer may also be injected into the first, second, or both loops. Comonomers include ethylene and C4 to C12 α-olefins, or cyclic olefins. Preferable comonomers include ethylene, 1-butene, 1-pentene, 1-hexene, and 1-octene.

A "slurry loop" olefin polymerization reactor can generally be described as a loop-shaped continuous tube. In some instances, the reactor design may be generally "0" shaped. One or more fluid circulating devices, such as an axial pump, urge the reactor constituents within the tube in a desired direction so as to create a circulating current or flow of the reactor constituents within the tube.

Desirably, the fluid circulating devices are designed to provide high velocity of motion and a very intensive and well-defined mixing pattern of the reactor constituents. The reactor may be totally or partially jacketed with cooling water in order to remove heat generated by polymer polymerization.

Figure 1:
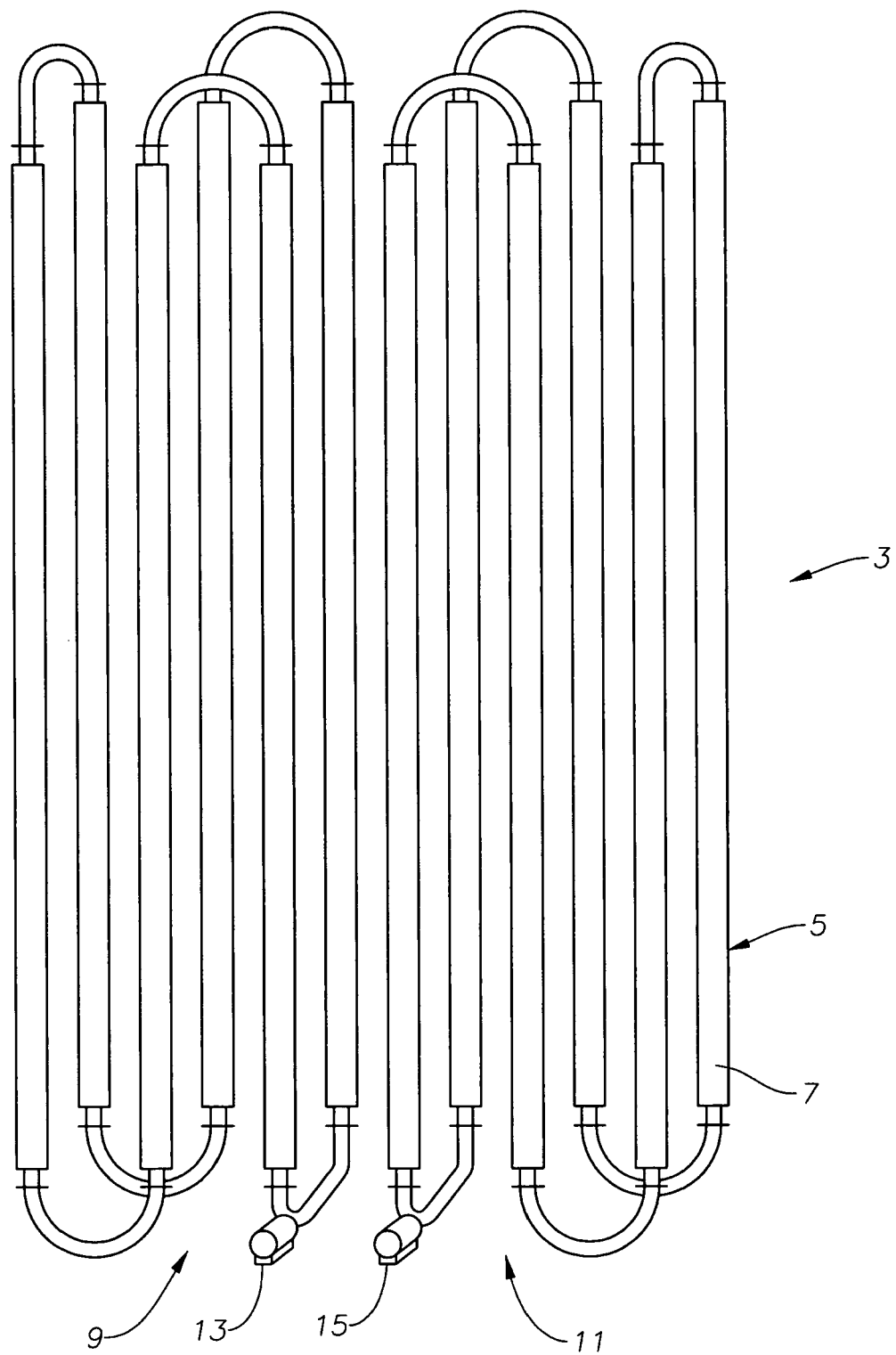
FIG. 1 is a representation of one embodiment of the series polypropylene reactor wherein each loop has six legs.

An embodiment of such a series reactor is shown in FIG. 1, wherein series reactor 3 includes a first loop 9 and second loop 11, each associated in one embodiment with a pump 13 and pump 15. In the embodiment of FIG. 1, each leg 5 is equipped with jacket 7 to allow for heat removal by flowing cooling liquid, preferably water, through the jackets. Each leg is fluidly connected to another leg at each end by bent piping as apparent in the embodiments of FIG. 1. In the embodiment of FIG. 1, each loop includes six legs. In another embodiment, the series reactor comprises a first loop and a second loop wherein each loop comprises eight legs. While not shown in FIG. 1, it should be apparent to those skilled in the art that there will be a fluid connection between the loops to allow flow of liquid and/or slurry and/or gaseous material there between.

In one embodiment of the series reactor, propylene and, if added, hydrogen, can be separated from the polymer being produced and recycled back to the first, second, or both loops. In one embodiment of the series reactor, recycled propylene and hydrogen is routed into the second loop through a recycle conduit. In certain embodiments of the series reactor, each leg of the first and second loop is jacketed. Heat of reaction can be removed by use of liquid flow, preferably water, through the jackets. In one embodiment, each jacket is independently supplied water, and in another embodiment, water flows through each jacket in series. The circulating slurry or liquid in each loop is kept preferably at a temperature of from 50° C. to 90° C., more preferably between 60° C. and 75° C. In another embodiment the circulating slurry or liquid in each loop is kept at a temperature below that which would cause the resulting polymer to dissolve in the monomer and/or diluent media.

The improved design and process described herein allows the series reactor of the present invention the capacity to produce from 600 kTons to 1000 kTons of polypropylene a year in one embodiment, more preferably from 600 to 800 kTons per year.

As stated above, in certain embodiments of the series reactor, propylene and, if added, hydrogen can be separated from the polymer being produced and recycled back to the first, second, or both loops. In one embodiment of the series reactor, unreacted propylene and hydrogen is routed only into the second loop through a fluid connection. In another embodiment of the series reactor, unreacted propylene and hydrogen is routed into both the first and second loops through a recycle conduit. This latter embodiment is shown as one possible design expressed in FIG. 2, wherein unreacted propylene and unreacted hydrogen is separated from polymer in propylene/polypropylene separator 33 and recycled back into the first and second loops through recycle conduit 17 which is fluidly connected to propylene feed drum 25. More preferably, as shown in FIG. 3, unreacted propylene and unreacted hydrogen is separated from polymer in propylene/polypropylene separator 61 and recycled back to the second loop 45 through recycle conduit 65 and 67. In yet another embodiment, "fresh" hydrogen can be injected into the first and second loops independently.

Figure 2:
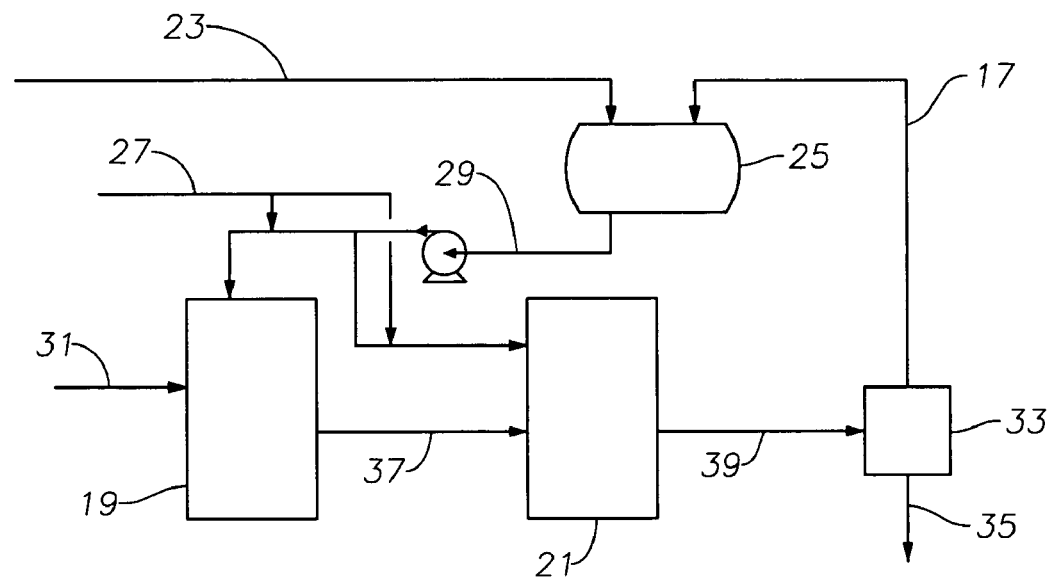
FIG. 2 is a representation of one embodiment of a series reactor scheme wherein recycled monomers and hydrogen flow back to both loop reactors.
Figure 3:
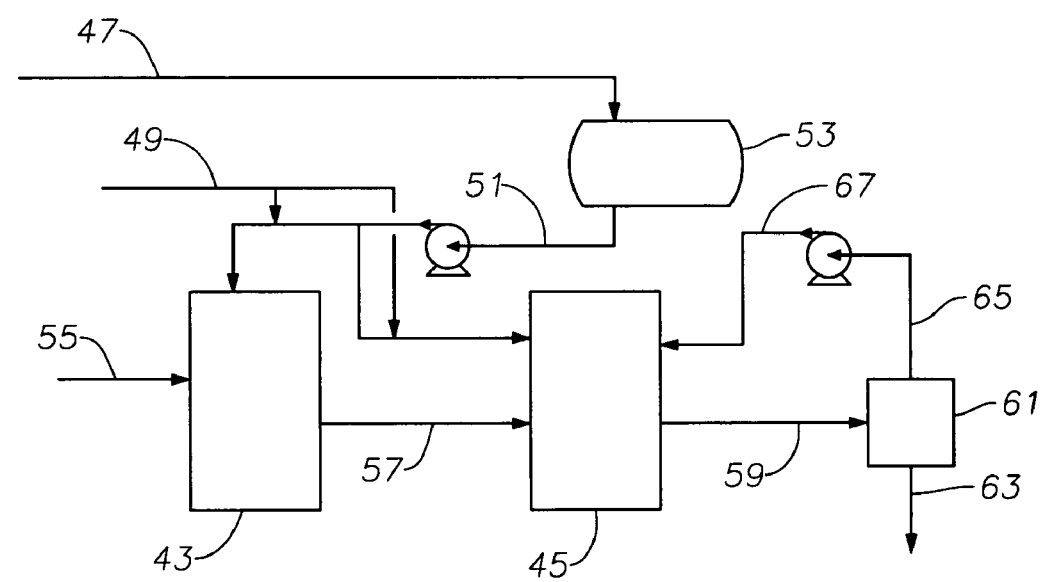
FIG. 3 is a representation of a preferred embodiment of a series reactor scheme wherein recycled monomers and hydrogen are recycled back to only the second loop reactor.

More particularly, FIG. 2 demonstrates one series reactor design wherein unreacted hydrogen and unreacted propylene are "recycled", or fluidly transported through conduits, etc., into both the first and second loops of the series reactor. In FIG. 2, fresh propylene ("propylene") is directed through conduit 23 into propylene feed drum 25, then through conduit 29 into the first loop 19. Fresh hydrogen ("hydrogen") is directed through conduit 27 into conduit 29, then into the first loop 19. Optionally, the hydrogen can be directed through a conduit directly into the first loop 19. Catalyst, such as a titanium/magnesium based Ziegler-Natta catalyst, chromium based catalysts, a Group 4 metallocene catalyst or others as known in the art, along with any co-catalyst, electron donor or initiator can be injected into the first loop 19 through conduit 31. Therein in the first loop 19 the propylene monomers, and optionally comonomers that are also directed into the first loop 19, can react to form polypropylene homopolymer or copolymer.

The polypropylene formed in the first loop 19 can then be cycled through conduit 37 into a second loop 21, wherein catalyst, unreacted propylene and unreacted hydrogen (if added) is also directed. In certain embodiments, comonomers can be independently directed into the second loop 21, as can hydrogen. The propylene and catalyst can then further react, with or without added comonomer, to further form polypropylene. From the second loop 21, polypropylene as well as unreacted propylene and unreacted hydrogen (and unreacted comonomer) is directed through conduit 39 into the propylene/polypropylene separator 33. Polymer is separated out and directed out of the separator as polymer stream 35. Conduit 17 allows for the unreacted fluids and gases to be directed to the propylene drum 25, when they can then be directed to loops 19 and 21. The conduit 17 may be any fluid connection as is known in the art such as, for example, pipes, tubes or other conduits.

In any embodiments described herein, there may also be included in the fluid stream a diluent such as propane, or other hydrocarbon. The pressure of the reacting monomers and optional diluent in the loops can range from 400 psig to 800 psig, preferably between 500 and 550 psig.

FIG. 3 demonstrates one series reactor design wherein unreacted hydrogen and unreacted propylene are "recycled", or fluidly transported through conduits, etc., into only the second loop of the series reactor. In FIG. 3, fresh propylene ("propylene") is directed through conduit 47 into propylene feed drum 53, then through conduit 51 into the first loop 43. Fresh hydrogen ("hydrogen") is directed through conduit 49 into conduit 51, then into the first loop 43. Optionally, the hydrogen can be directed through a conduit directly into the first loop 43. Catalyst, such as a titanium/magnesium based Ziegler-Natta catalyst or a Group 4 metallocene catalyst, can be injected into the first loop 43 through conduit 55. Therein in the first loop 43 the propylene monomers, and optionally comonomers that are also directed into the first loop 43 can react to form polypropylene homopolymer or copolymer.

Still referring to FIG. 3, the polypropylene formed in the first loop 43 can then be cycled through conduit 57 into a second loop 45, wherein catalyst, unreacted propylene and unreacted hydrogen (if added) is also directed. In certain embodiments, comonomers can be independently directed into the second loop 45, as can hydrogen. The propylene and catalyst can then further react, with or without added comonomer, to further form polypropylene. From the second loop 45, polypropylene as well as unreacted propylene and unreacted hydrogen (and unreacted comonomer) is directed through conduit 59 into the propylene/polypropylene separator 61. Polymer is separated out and directed out of the separator as polymer stream 63. Conduit 65 and conduit 67 allows for the unreacted fluids and gases to be directed to second loop 45, thus not allowing unreacted or "recycled" monomers and hydrogen to enter the first loop 43. The conduits 65 and 67 may be any fluid connection as is known in the art such as, for example, pipes, tubes or other conduits.

Another aspect of the invention is directed to a process for producing polypropylene comprising providing a series reactor comprising a first and a second loop that allows for the flow of polypropylene, catalyst, hydrogen and propylene (and optionally a diluent) there between, wherein each loop comprises from six to eight legs, each leg having fluid connections there between; injecting into the first loop an amount of a catalyst, propylene and optionally hydrogen; withdrawing polypropylene, and unreacted propylene and optionally unreacted hydrogen from the first loop and injecting the polypropylene, and unreacted propylene and optionally unreacted hydrogen into the second loop; and providing a propylene/polypropylene separator fluidly connected to the second loop and isolating polypropylene therefrom.

In one embodiment of this aspect of the invention a recycle conduit is provided between the propylene/polypropylene separator and the second loop to allow recycling of unreacted propylene and optionally hydrogen (and optionally a diluent and/or comonomer) into the second loop. In another embodiment, fresh propylene ("propylene") and optionally fresh hydrogen ("hydrogen") are injected into the second loop.

The type of propylene polymer that can be made using the methods and apparatus of the invention are not limited. Preferably, a propylene homopolymer is produced by the method of the invention. In another embodiment, a propylene copolymer is produced, wherein propylene derived units comprise at least 50 wt % of the polymer, more preferably at least 60 wt %, and most preferably at least 70 wt %. In one embodiment the polypropylene (either homopolymer or copolymer) is bimodal in molecular weight. By "bimodal"; what is meant is that two distinct peaks in a GPC fractionation of the polymer can be detected that indicates two distinct molecular weight propylene polymers being present and intimately blended into one polypropylene composition.

The series polypropylene reactor of the present invention can be used in series with any other type of reactor. For example, a fluidized bed gas phase reactor can be made part of a series reactor system in line with the present reactor wherein polymer flow 63 (FIG. 3) is directed into the gas phase reactor. Other reactors can also be used such as stirred bed reactors, solution reactors and any other type of reactor suitable for producing polyolefins such as polyethylenes and polypropylenes. Such reactor designs are particularly suitable for making impact copolymers, for example, which is essentially a blend of a polypropylene and an ethylene-propylene rubber.

Embodiments of the present invention change the traditional reactor design from four legs in each of two loops operating in series to six (or eight) legs in each of the two reactors. This increases both the heat transfer area and reactor volume by 50% (or 100%) allowing for an increase in plant capacity to a nominal 600 kTons per year. A further increase to 8 legs per reactor is also possible and would increase plant capacity to a nominal 800 kTons per year.

The problem with the ability to produce different molecular weight polymers in the two reactors is solved by keeping the recycle propylene/propane/hydrogen separated from the fresh propylene and pumping them separately to the two loop reactors. This allows for the majority of the recycle propylene/propane/hydrogen to be routed directly to the second reactor and for the feed to the first reactor to be essentially only fresh propylene. This allows for the hydrogen concentration in the first loop reactor to be very low even when large amounts of hydrogen are added to the second loop reactor.

Accordingly, the various embodiments described herein may be combined with aspects of the invention. In a first (1) aspect is provided a series polypropylene reactor comprising a first and a second loop allowing flow of polypropylene, catalyst, hydrogen and propylene there between, wherein each loop comprises from six to eight legs, each leg having fluid connections there between. Other features may be variously combined as follows:

1. The reactor of embodiment 1, further comprising a propylene/polypropylene separator fluidly connected to the second loop to allow recycled propylene and hydrogen to be routed into the second loop.
2. The reactor of embodiments 1 and 2, wherein each leg of the first and second loop is jacketed.
3. The reactor of any of the previously numbered embodiments, having a capacity to produce from 600 kTons to 1000 kTons of polypropylene a year.
4. The reactor of any of the previously numbered embodiments, wherein hydrogen can be injected into the first and second loops independently.
5. A process for producing polypropylene comprising:
    (a) providing a reactor of any of the previously numbered embodiments;
    (b) injecting into the first loop an amount of a catalyst, propylene and optionally hydrogen;
    (c) withdrawing polypropylene, and unreacted propylene and optionally unreacted hydrogen from the first loop and injecting the polypropylene, and unreacted propylene and optionally unreacted hydrogen into the second loop; and
    (d) providing a propylene/polypropylene separator fluidly connected to the second loop and isolating polypropylene therefrom.

Yet another aspect of the invention is directed to the use of a series polypropylene reactor to form a polypropylene, the reactor comprising a first and a second loop allowing flow of polypropylene, catalyst, hydrogen and propylene there between, wherein each loop comprises from six to eight legs, each leg having fluid connections there between. In one embodiment, the polypropylene is bimodal in molecular weight.

While aspects of the invention have been described herein, it will be apparent to one skilled in the art that the various embodiments can be combined or equivalent materials and means can be substituted for those described herein.

What is claimed is:

1. A series polypropylene reactor comprising:
    a first and a second loop allowing flow of polypropylene, catalyst, hydrogen and propylene there between, wherein each loop comprises from six to eight legs, each leg having fluid connections there between; and
    a propylene/polypropylene separator located downstream of and fluidly connected to the second loop to allow recycled propylene and hydrogen to be routed only into the second loop.

2. The reactor of claim 1, wherein each leg of the first and second loop is jacketed.

3. The reactor of claim 1, having a capacity to produce from 600 kTons to 1000 kTons of polypropylene a year.

4. The reactor of claim 1, wherein hydrogen can be injected into the first and second loops independently.

5. A process for producing polypropylene comprising:

(a) providing series reactors comprising a first and a second loop allowing flow of polypropylene, catalyst, hydrogen and propylene there between, wherein each loop comprises from six to eight legs, each leg having fluid connections there between;

(b) injecting into the first loop an amount of a catalyst, propylene and optionally hydrogen;

(c) withdrawing polypropylene, and unreacted propylene and optionally unreacted hydrogen from the first loop and injecting the polypropylene, and unreacted propylene and optionally unreacted hydrogen into the second loop;

(d) providing a propylene/polypropylene separator located downstream of and fluidly connected to the second loop and isolating polypropylene therefrom; and (e) providing a fluid connection between the propylene/polypropylene separator and the second loop and recycling unreacted propylene and optionally hydrogen only into the second loop.

6. The process of claim 5, wherein propylene and optionally hydrogen are injected into the second loop.

7. The process of claim 5, wherein the polypropylene is bimodal in molecular weight.

8. The process of claim 5, wherein each leg of the reactor is jacketed and cooling liquid is injected independently into each jacket.

* * * * *